(12) United States Patent
McKee et al.

(10) Patent No.: US 7,921,841 B2
(45) Date of Patent: Apr. 12, 2011

(54) HIGH-SPEED COOKING OVEN WITH OPTIMIZED COOKING EFFICIENCY

(75) Inventors: Philip R. McKee, Frisco, TX (US); Earl R. Winkelmann, Garland, TX (US)

(73) Assignee: Appliance Scientific, Inc., Dallas, TX (US)

( * ) Notice: Subject to any disclaimer, the term of this patent is extended or adjusted under 35 U.S.C. 154(b) by 832 days.

(21) Appl. No.: 11/981,317

(22) Filed: Oct. 31, 2007

(65) Prior Publication Data

US 2008/0283035 A1    Nov. 20, 2008

Related U.S. Application Data

(62) Division of application No. 11/803,787, filed on May 15, 2007, now Pat. No. 7,435,931.

(51) Int. Cl.
*F24C 15/32* (2006.01)
*A21B 1/00* (2006.01)

(52) U.S. Cl. ..................................... 126/21 A; 126/21 R

(58) Field of Classification Search ................. 126/21 A, 126/19 R–22
See application file for complete search history.

(56) References Cited

U.S. PATENT DOCUMENTS

| | | |
|---|---|---|
| 2,617,966 A | 11/1952 | Kilgore |
| 3,397,817 A | 8/1968 | Smith |
| 4,332,992 A | 6/1982 | Larsen |
| 4,335,290 A | 6/1982 | Teich |
| 4,876,426 A | 10/1989 | Smith |
| 5,128,158 A | 7/1992 | Chartrain et al. |
| 5,166,487 A | 11/1992 | Hurley et al. |
| 5,254,823 A | 10/1993 | McKee et al. |
| 5,401,940 A | 3/1995 | Smith et al. |
| 5,416,304 A | 5/1995 | De La Cruz |
| 5,434,390 A | 7/1995 | McKee et al. |
| 5,483,044 A | 1/1996 | Thorneywork et al. |
| 5,558,793 A | 9/1996 | McKee et al. |
| 5,676,870 A | 10/1997 | Wassman et al. |
| 5,683,240 A | 11/1997 | Smith |
| 5,816,234 A | 10/1998 | Vasan |

(Continued)

FOREIGN PATENT DOCUMENTS

WO    PCTUS2008055518    5/2008

(Continued)

*Primary Examiner* — Daniel Robinson
(74) *Attorney, Agent, or Firm* — Ohlandt, Greeley, Ruggiero & Perle, L.L.P.

(57) ABSTRACT

The present invention is directed to improving the conventional high-speed cooking oven based on a combination of hot air impingement and microwave heating by providing a time-dependent spatial variation in the net air impingement and/or net microwave energy applied to the food product in the oven. This is aimed at optimizing heat transfer and microwave efficiencies in a high-speed cooking oven, thereby enabling the oven to deliver an optimal cooking efficiency in comparison to the conventional high-speed cooking oven. In addition, under the present invention, the cooking efficiency may be further optimized by dimensioning the nozzles for hot air impingement to tighten impingement plumes, subject to the space constraint of the oven's cooking chamber, and dimensioning the cooking chamber of the oven in integer multiples of the wavelength of the microwave energy to match the microwave load. With the optimized cooking efficiency provided by the present invention, the high speed cooking technology may now be extended to ovens operating on a power supply based on a voltage less than 220 volts, preferably between 110 and 125 volts, with more productive results, so that the high-speed cooking technology may find a wider applicability and customer base.

24 Claims, 6 Drawing Sheets

U.S. PATENT DOCUMENTS

| | | | |
|---|---|---|---|
| 5,818,014 A | 10/1998 | Smith et al. | |
| 5,868,565 A * | 2/1999 | Nowack | 432/128 |
| 5,927,265 A | 7/1999 | McKee et al. | |
| 5,928,541 A | 7/1999 | Tsukamoto et al. | |
| 5,958,274 A | 9/1999 | Dobie et al. | |
| 5,990,466 A | 11/1999 | McKee et al. | |
| 6,008,483 A | 12/1999 | McKee et al. | |
| 6,060,701 A | 5/2000 | McKee et al. | |
| 6,140,626 A | 10/2000 | McKee et al. | |
| 6,262,406 B1 | 7/2001 | McKee et al. | |
| 6,320,165 B1 * | 11/2001 | Ovadia | 219/400 |
| 6,392,211 B2 | 5/2002 | Kim et al. | |
| 6,403,937 B1 | 6/2002 | Day et al. | |
| 6,486,453 B1 | 11/2002 | Bales et al. | |
| 6,716,467 B2 | 4/2004 | Cole | |
| 6,776,611 B1 * | 8/2004 | Sprague | 432/64 |
| 6,805,112 B2 | 10/2004 | Cole et al. | |
| 6,874,495 B2 | 4/2005 | McFadden | |
| 7,055,518 B2 | 6/2006 | McFadden et al. | |
| 7,087,872 B1 | 8/2006 | Dobie et al. | |
| 7,705,274 B2 * | 4/2010 | Andoh et al. | 219/401 |
| 7,798,138 B2 * | 9/2010 | Babington | 126/19 R |
| 2005/0205566 A1 | 9/2005 | Kassayan | |
| 2005/0217503 A1 | 10/2005 | McFadden | |
| 2005/0236388 A1 | 10/2005 | Goranson | |
| 2006/0191918 A1 | 8/2006 | Ashford et al. | |

FOREIGN PATENT DOCUMENTS

WO  PCTUS20008006246    11/2008

* cited by examiner

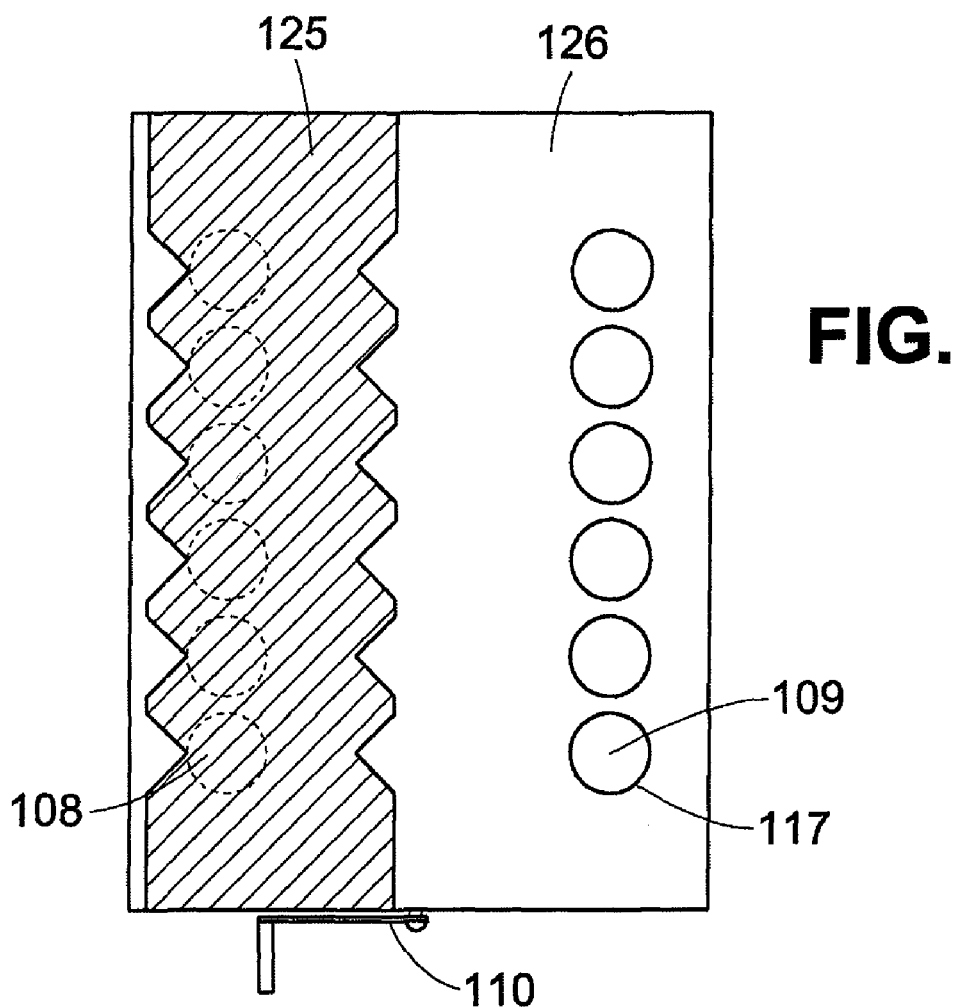

HIGH-SPEED COOKING OVEN WITH OPTIMIZED COOKING EFFICIENCY

CROSS-REFERENCE TO RELATED APPLICATION

This application is a divisional of, and claims the benefit of, U.S. patent application Ser. No. 11/803,787, filed on May 15, 2007 now U.S. Pat. No. 7,435,931, which is incorporated herein by reference.

FIELD OF INVENTION

The present invention generally relates to an oven for cooking a food product. More particularly, the present invention relates to a high-speed cooking oven with optimal cooking efficiency.

BACKGROUND OF THE INVENTION

Hot air impingement and microwave radiation are two different means for heating and cooking a food product based on different physical principles. Hot air impingement is based on the transfer of heat from a hot air having a higher temperature to an object having a lower temperature, changing the internal energy of the air and the object in accordance with the first law of thermodynamics. On the other hand, microwave radiation consists of electromagnetic waves having a typical wavelength of 12.24 cm or 4.82 inches and a frequency of 2,450 MHz, which are capable of causing dielectric heating of water, fat and sugar molecules in a food product.

Initially, ovens based on hot air impingement and microwave ovens were separately developed and commercialized. However, it was later demonstrated that a combination of hot air impingement and microwave radiation used in an oven can facilitate high-speed, high-quality cooking. See, for example, U.S. Pat. No. 5,254,823 to McKee et al., U.S. Pat. No. 5,434,390 to McKee et al., U.S. Pat. No. 5,558,793 to McKee et al., and U.S. Pat. No. 6,060,701 to McKee et al. This led to the development and commercialization of quick-cooking hybrid ovens based on both hot air impingement and microwave radiation and has established a new standard in the high-speed cooking technology.

While the technology of combining hot air impingement and microwave heating to achieve high-speed cooking in an oven has by now been well established, the current technology does not address a host of new challenges created by such combination, including the problem of inefficient energy use and consequent suboptimal cooking efficiency in the existing high-speed cooking ovens. The fundamental principle of cooking ovens is conversion of an available power (e.g., electric power) into heat energy to be directed to and absorbed by a food product in the oven to raise its internal temperature. Accordingly, the optimal cooking efficiency of an oven requires that the amount of heat energy converted from a given power be maximized; the amount of the heat energy directed to a food product in the oven be maximized; and the amount of the heat energy absorbed and retained by the food product be maximized. However, the current technology of the high-speed cooking ovens using both hot air impingement and microwave radiation is not directed to achieving such optimal cooking efficiency.

As a food product resides in a hot air environment of an oven, temperature gradients, or several boundary layers, form around the cooler food product. The oven cooks the food product by transferring the heat energy to the food product through these temperature gradients. Forced air convection by, for example, a fan can improve the heat transfer by "wiping away" the temperature gradients around the food product and bringing the higher temperature air closer to the food product. Hot air impingement can further improve the heat transfer by "piercing" the temperature gradients with jets of hot air and bringing the air at higher temperature closer to the surface of the food product. However, significant portions of the electric power and the heat energy from the hot air impingement are lost in the process to the oven walls, various openings, plenum and air blower that form the hot air circulation and delivery system of the oven. In addition, the presence of a microwave launcher in the cooking chamber may further reduce the efficiency of heat transfer by the hot air impingement.

Another well-known problem with the technique of hot air impingement is "spotting" in the areas directly impacted by the hot air jets, causing uneven heating or scorching of the surface of the food product. While this problem may be resolved by, for example, reduction in the hot air velocity and/or increase in the diameter of the columns of impinging hot air, such solutions may further reduce the efficiency of the hot air impingement.

In addition, the diameter/cross-sectional area of a column of hot air impingement generally increases as the distance from the hot air jet orifice increases, thereby reducing the efficiency of hot air impingement. While this problem may be solved by increasing the hot air velocity, as discussed above, such solution may further aggravate the spotting problem.

As for the microwave portion of the conventional high-speed cooking oven, a portion of the electric power is lost to heat within the transformer and magnetron during the process of generating microwaves. In addition, some portion of microwave energy is lost when reflected from the cavity walls back to the magnetron and dissipated through the cooling fan. This can occur when there is an uneven matching between the microwave delivery system and the microwave load.

Furthermore, it is also well known that microwave provides uneven heat energy distribution across the volume of a cooking cavity. While the horizontal unevenness may be eliminated by rotating the food product around a vertical axis in the oven, as many conventional microwave ovens do, such solution does little to reduce the vertical unevenness in the heat energy distribution.

There is yet another source of inefficiency in the conventional high-speed cooking oven. Until the temperature at any portion of a food product in the oven reaches 212° F. at which the water molecules in the food product start being converted into steam during the cooking process, the amount of the energy absorbed by the food product roughly equals the amount of the energy directed at the food product. However, after the point when the water starts to be converted into steam, a portion of the energy directed at the food product is not absorbed by the food product, but is lost as the energy of activating the water into steam, which subsequently escapes from the food product carrying away a portion of thermal energy from the food product. This phenomenon is further complicated by the fact that the heat energy absorbed at the surface of the food product is not immediately dispersed downward below the surface due to the finite heat transfer coefficient (or thermal conductivity) of the food product and it takes some time to bring the inner mass of the food product into thermal equilibrium with the surface. Accordingly, the efficiency in heat transfer to the food product in the oven decreases after the temperature of the food surface reaches 212° F., when the resulting steam at a higher temperature than the inner temperature of the food product carries away heat energy from the food product.

In summary, the problem with the current high-speed cooking technology based on a combination of hot air impingement and microwave radiation is that the combination has never been done in a way to optimize the cooking efficiency of the oven. With the suboptimal cooking efficiency in the presence of various sources of inefficiencies in the conversion of electrical power to heat, the currently available high-speed cooking ovens (either commercial models or residential models) operate on a power supply based on 220 volts or greater. As a result, this relatively high electric power required to operate the high-speed cooking oven limits the universe of possible applications and customer bases, especially in residential households where a 120 volt-based power supply is more common.

Thus, it is an object of the present invention to eliminate or reduce some of the inefficiencies in heat transfer present in the conventional high-speed cooking ovens.

It is yet another object of the present invention to optimize the cooking efficiency of a high-speed cooking oven.

It is yet another object of the present invention to optimize the combination of hot air impingement and microwave to seek the greater cooking efficiency than was possible in the conventional high-speed cooking oven.

It is yet another object of the present invention to optimize the cooking efficiency of the hot air impingement.

It is yet another object of the present invention to optimize the cooking efficiency of the microwave heating.

It is yet another object of the present invention to resolve the spotting problem without compromising the cooking efficiency of the hot air impingement.

It is yet another object of the present invention to provide a more even distribution of microwave heating compared to the conventional high-speed cooking oven.

It is yet another object of the present invention to match the cavity of a high-speed cooking oven to the microwave load.

It is yet another object of the present invention to optimize the efficiency of heat transfer to a food product in the oven by overcoming the inefficiency created by the heat loss due to the water steam escaping from the food product at 212° F. and the time lag in the heat energy distribution in the inner mass of the food product due to its finite heat transfer coefficient.

It is yet another object of the present invention to provide a high-speed cooking oven that can operate on a power supply based on voltage less than 220 volts.

It is yet another object of the present invention to provide a high-speed cooking oven that can operate on a power supply based on a voltage between 110 and 125 volts.

It is yet another object of the present invention to provide a high-speed cooking oven capable of operating on a power supply based on the voltage of 120 volts and the current of 30 Amperes.

It is yet another object of the present invention to reduce the operating costs of high-speed cooking ovens.

Other objects and advantages of the present invention will become apparent from the following description.

SUMMARY OF THE INVENTION

It has now been found that the above-mentioned and related objects of the present invention are obtained in the form of several separate, but related, aspects including an oven for cooking a food product at least partially by hot air impingement and/or at least partially by microwave.

More particularly, an oven for cooking a food product according to an exemplary embodiment of the present invention comprises a cooking chamber comprising a top and a support for receiving the food product for cooking, a conduit for providing a gas into the cooking chamber, a thermal energy source for heating the gas disposed in the conduit, a first nozzle for causing a first impingement of the gas from the conduit into the cooking chamber, a second nozzle for causing a second impingement of the gas from the conduit into the cooking chamber, and an air modulator for controlling respective flow rates of the gas for the first and the second impingements, wherein the first nozzle is configured and positioned to direct the first impingement of the gas generally toward a first side of the support, the second nozzle is configured and positioned to direct the second impingement of the gas generally toward a second side of the support, the first and the second sides being generally opposite sides of the support, the first and the second nozzles are further configured and positioned to respectively direct the first and the second impingements of the gas to meet each other at a distance from the support in the cooking chamber, and the air modulator is adapted to cause a time-dependent spatial variation in the sum of the first and the second impingements of the gas applied to the food product in the cooking chamber.

In at least one embodiment, the first side comprises a right edge of the support and the second side comprises a left edge of the support.

In at least one embodiment, the first and the second nozzles are further configured and positioned to respectively direct the first and the second impingements of the gas to meet each other above the midpoint between the first and the second sides of the support in the cooking chamber.

In at least one embodiment, the first and the second nozzles are further configured and positioned to respectively direct the first and the second impingements of the gas to meet each other above the food product on the support in the cooking chamber.

In at least one embodiment, the first and the second nozzles are dimensioned to optimize the flow rates of the gas.

In at least one embodiment, the diameter of each of the first and the second nozzles is dimensioned to optimize the flow rate of the corresponding nozzle.

In at least one embodiment, the length of each of the first and the second nozzles is dimensioned to optimize the flow rate of the corresponding nozzle and the dimension of the cooking chamber simultaneously.

In at least one embodiment, the length of each of the first and the second nozzles is substantially 3 inches.

In at least one embodiment, the ratio of the inlet orifice area to the exit orifice area for each of the first and the second nozzles is set to optimize the air impingement from the corresponding nozzle.

In at least one embodiment, the ratio of the inlet orifice area to the exit orifice area for each of the first and the second nozzles is substantially 4 to 1.

In at least one embodiment, the respective directions of the first and the second impingements of the gas are at a substantially 90-degree angle with respect to each other.

In at least one embodiment, the first and the second nozzles are further configured to respectively direct the first and the second impingements of the gas at a substantially 45-degree angle with respect to the support.

In at least one embodiment, the first nozzle is positioned at a first half of the top and the second nozzle is positioned at a second half of the top.

In at least one embodiment, the air modulator is configured to provide a first periodic modulation in time of the flow rate of the gas for the first impingement and a second periodic modulation in time of the flow rate of the gas for the second impingement, the first and the second periodic modulations having substantially the same amplitude and period but differing in phase by 180 degrees.

In at least one embodiment, the sum of the first and the second periodic modulations is substantially constant in time.

In at least one embodiment, the first periodic modulation comprises a first sinusoidal function in time for the flow rate of the first impingement and the second periodic modulation comprises a second sinusoidal function in time for the flow rate of the second impingement, the first and the second sinusoidal functions having substantially the same amplitude and period but differing in phase by 180 degrees.

In at least one embodiment, the oven further comprises a support controller for modulating in time the distance of the support from the first and the second nozzles.

In at least one embodiment, the oven further comprises a third nozzle for causing a third impingement of the gas from the conduit into the cooking chamber, the third nozzle being configured and positioned to direct the third impingement of the gas below the support.

In at least one embodiment, the conduit comprises a first return air exit and a second return air exit below the support in the cooking chamber, the first and the second return air exits being positioned on the opposite sides of the cooking chamber respectively proximate to the first and the second sides of the support.

In at least one embodiment, the oven further comprises a return air exit controller for controlling the closing and the opening of each of the first and the second return air exits.

In at least one embodiment, the return air exit controller and the air modulator are adapted to operate in synchronization.

In at least one embodiment, the return air exit controller is adapted to close the first return air exit and open the second return air exit when the first air impingement is greater than the second air impingement, and to open the first return air exit and close the second return air exit when the second air impingement is greater than the first air impingement.

In at least one embodiment, the oven is adapted to be powered by a voltage less than 220 volts.

In at least one embodiment, the voltage is between 110 and 125 volts.

In at least one embodiment, the oven further comprises one or more magnetrons, a first microwave resonator for directing a first microwave energy generated by the one or more magnetrons into the cooking chamber, a second microwave resonator for directing a second microwave energy generated by the one or more magnetrons into the cooking chamber, and a microwave modulator for controlling each of the first and the second microwave energies, wherein the first microwave resonator is configured and positioned to direct the first microwave energy to propagate generally toward the first side of the support, the second microwave resonator is configured and positioned to direct the second microwave energy to propagate generally toward the second side of the support, the first and the second microwave resonators are further configured and positioned to respectively direct the first and the second microwave energies to cross at a distance from the support in the cooking chamber, and the microwave modulator is adapted to cause a time-dependent spatial variation in the sum of the first and the second microwave energies applied to the food product in the cooking chamber.

In at least one embodiment, the first side comprises a right edge of the support and the second side comprises a left edge of the support.

In at least one embodiment, the first and the second microwave resonators are further configured and positioned to respectively direct the first and the second microwave energies to cross above the midpoint between the first and the second sides of the support in the cooking chamber.

In at least one embodiment, the first and the second microwave resonators are further configured and positioned to respectively direct the first and the second microwave energies to cross above the food product on the support in the cooking chamber.

In at least one embodiment, the first and the second microwave resonators are further configured and positioned to respectively direct the first and the second microwave energies to cross at the center of the food product on the support in the cooking chamber.

In at least one embodiment, the cooking chamber is dimensioned to match a microwave load of the oven.

In at least one embodiment, the cooking chamber is dimensioned in integer multiples of the wavelength of the first and the second microwave energies.

In at least one embodiment, at least one of the length, width and height of the cooking chamber is sized in integer multiples of the wavelength of the first and the second microwave energies.

In at least one embodiment, the respective directions of the first and the second microwave energies are at a substantially 90-degree angle with respect to each other.

In at least one embodiment, the first and the second microwave resonators are directed at a substantially 45-degree angle with respect to the support.

In at least one embodiment, the first microwave resonator is positioned at substantially near a first side of the top and the second microwave resonator is positioned at substantially near a second side of the top, the first and the second sides being opposite sides of the top.

In at least one embodiment, the first side of the top comprises a left edge of the top and the second side of the top comprises a right edge of the top.

In at least one embodiment, the microwave modulator comprises a voltage regulator for modulating a voltage for the one or more magnetrons.

In at least one embodiment, the microwave modulator comprises a switch for turning on and off an electrical power to the one or more magnetrons.

In at least one embodiment, the microwave modulator is configured to provide a first periodic modulation in time of the first microwave energy and a second periodic modulation in time of the second microwave energy, the first and the second periodic modulations having substantially the same amplitude and period but differing in phase by 180 degrees.

In at least one embodiment, the sum of the first and the second periodic microwave modulations is substantially constant in time.

In at least one embodiment, the first periodic modulation comprises a first sinusoidal function in time for the first microwave energy and the second periodic modulation comprises a second sinusoidal function in time for the second microwave energy, the first and the second sinusoidal functions having substantially the same amplitude and period but differing in phase by 180 degrees.

In at least one embodiment, the oven further comprises a support controller for modulating in time the distance of the support from the first and the second microwave resonators.

In at least one embodiment, the first and the second nozzles are dimensioned to prevent microwave resonances within the nozzles.

In at least one embodiment, the diameter of each of the first and the second nozzles is dimensioned to optimize the flow rate of the corresponding nozzle and to prevent entry of the first or the second microwave energies simultaneously.

In at least one embodiment, the diameter of each of the first and the second nozzles is substantially 0.75 inches.

In at least one embodiment, the microwave modulator is adapted to operate in phase with the air modulator.

In at least one embodiment, the microwave modulator is adapted to operate out of phase with the air modulator.

In at least one embodiment, each of the first and the second microwave resonators comprises an upper resonator coupled to the one or more magnetrons and a lower resonator with an opening to the cooking chamber.

In at least one embodiment, at least one width of the lower resonator is substantially equal to the wavelength of a standing microwave in the upper resonator.

The present invention is also directed to an oven for cooking, comprising a cooking chamber comprising a top and a support for receiving a food product for cooking, one or more magnetrons, a first microwave resonator for directing a first microwave energy generated by the one or more magnetrons into the cooking chamber, a second microwave resonator for directing a second microwave energy generated by the one or more magnetrons into the cooking chamber, and a microwave modulator for controlling the energy of each of the first and the second microwave energies, wherein the first microwave resonator is configured and positioned to direct the first microwave energy to propagate generally toward a first side of the support, the second microwave resonator is configured and positioned to direct the second microwave energy to propagate generally toward a second side of the support, the first and the second sides being generally opposite sides of the support, the first and the second microwave resonators are further configured and positioned to respectively direct the first and the second microwave energies to cross at a distance from the support in the cooking chamber, and the microwave modulator is adapted to cause a time-dependent spatial variation in the sum of the first and the second microwave energies applied to the food product in the cooking chamber.

In at least one embodiment, the first side comprises a right edge of the support and the second side comprises a left edge of the support.

In at least one embodiment, the first and the second microwave resonators are further configured and positioned to respectively direct the first and the second microwave energies to cross above the midpoint between the first and the second sides of the support in the cooking chamber.

In at least one embodiment, the first and the second microwave resonators are further configured and positioned to respectively direct the first and the second microwave energies to cross above the food product on the support in the cooking chamber.

In at least one embodiment, the first and the second microwave resonators are further configured and positioned to respectively direct the first and the second microwave energies to cross substantially at the center of the food product on the support in the cooking chamber.

In at least one embodiment, the cooking chamber is dimensioned to match a microwave load of the oven.

In at least one embodiment, the cooking chamber is dimensioned in integer multiples of the wavelength of the first and the second microwave energies.

In at least one embodiment, at least one of the length, width and height of the cooking chamber is sized in integer multiples of the wavelength of the first and the second microwave energies.

In at least one embodiment, the respective directions of the first and the second microwave energies are at a substantially 90-degree angle with respect to each other.

In at least one embodiment, the first and the second microwave resonators are directed at a substantially 45-degree angle with respect to the support.

In at least one embodiment, the first microwave resonator is positioned at substantially near a first side of the top and the second microwave resonator is positioned at substantially near a second side of the top, the first and the second sides being opposite sides of the top.

In at least one embodiment, the first side of the top comprises a left edge of the top and the second side of the top comprises a right edge of the top.

In at least one embodiment, the microwave modulator comprises a voltage regulator for modulating a voltage for the one or more magnetrons.

In at least one embodiment, the microwave modulator comprises a switch for turning on and off an electrical power to the one or more magnetrons.

In at least one embodiment, the microwave modulator is configured to provide a first periodic modulation in time of the first microwave energy and a second periodic modulation in time of the second microwave energy, the first and the second periodic modulations having substantially the same amplitude and period but differing in phase by 180 degrees.

In at least one embodiment, the sum of the first and the second periodic modulations is substantially constant in time.

In at least one embodiment, the first periodic modulation comprises a first sinusoidal function in time for the first microwave energy and the second periodic modulation comprises a second sinusoidal function in time for the second microwave energy, the first and the second sinusoidal functions having substantially the same amplitude and period but differing in phase by 180 degrees.

In at least one embodiment, the oven further comprises a support controller for modulating in time the distance of the support from the first and the second microwave resonators.

In at least one embodiment, the oven is adapted to be powered by a voltage less than 220 volts.

In at least one embodiment, the voltage is between 110 and 125 volts.

In at least one embodiment, each of the first and the second microwave resonators comprises an upper resonator coupled to the one or more magnetrons and a lower resonator with an opening directed to the cooking chamber.

In at least one embodiment, at least one width of the lower resonator is substantially equal to the wavelength of a standing microwave in the upper resonator.

These and other features of this invention are described in, or are apparent from, the following detailed description of various exemplary embodiments of this invention.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein:

FIGS. 5A, 5B and 5C respectively illustrate various positions of an air modulating cover in an alternative embodiment viewed from the top.

DETAILED DESCRIPTION OF PREFERRED EMBODIMENTS

While the present invention will be described in terms of a stand-alone or counter-top high-speed cooking oven, it will be apparent to those skilled in the art that an oven according to the present invention may alternatively be implemented as a wall unit, a console model having feet adapted to rest on the floor, part of a vending machine, or other variations thereof.

Figure 1:
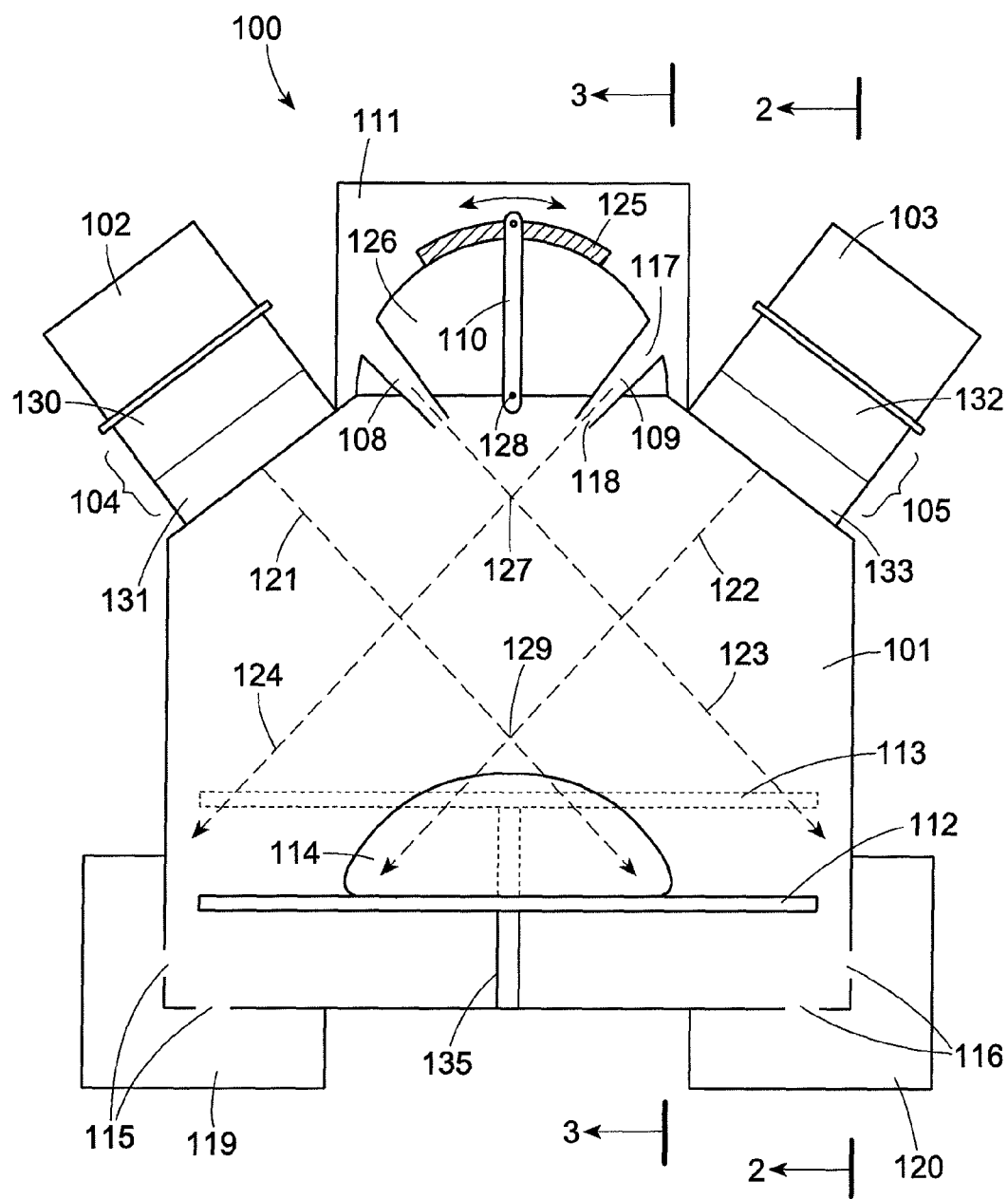
FIG. 1 illustrates a sectional view of an exemplary embodiment of the present invention.
Figure 2:
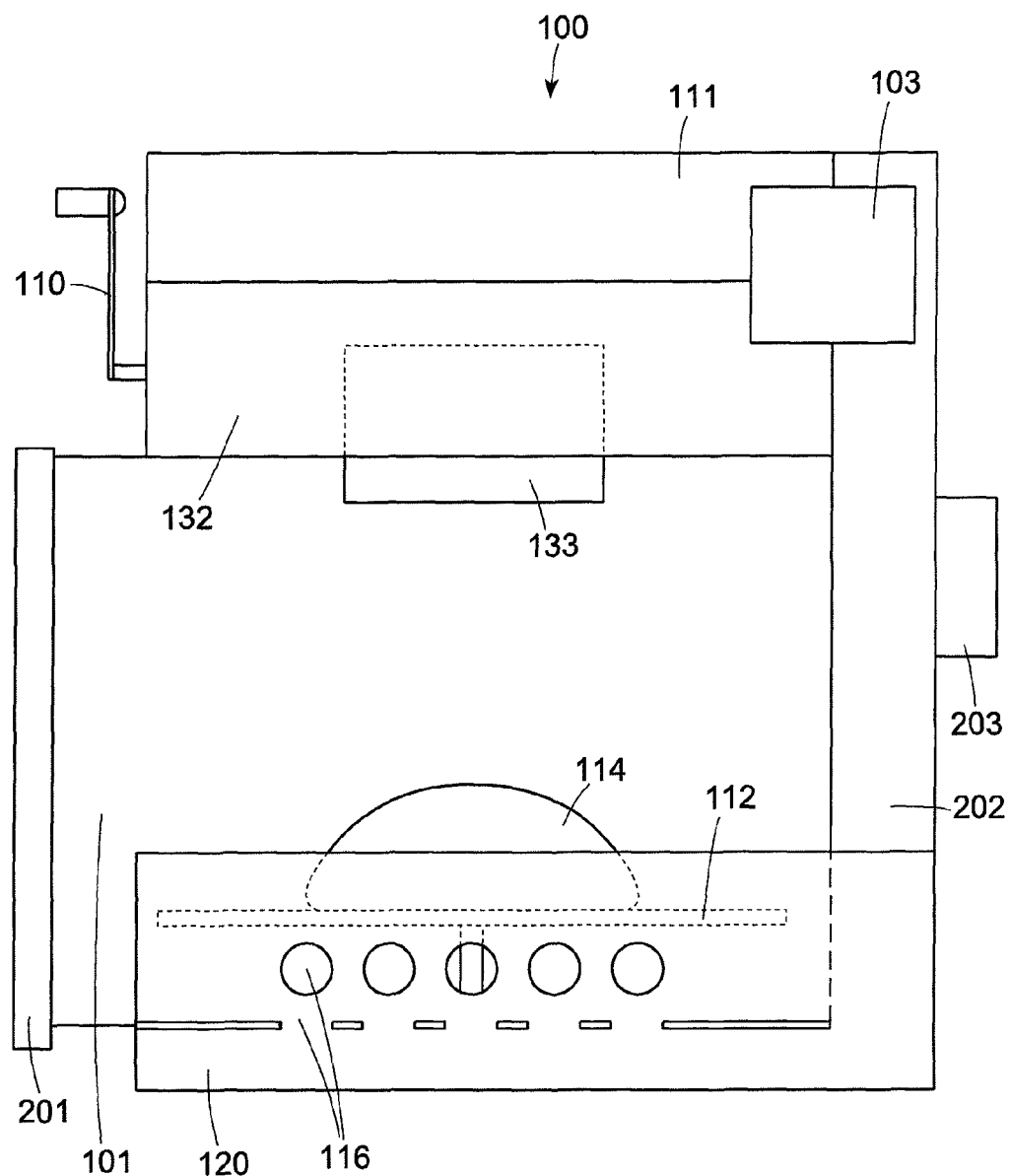
FIG. 2 illustrates another sectional view thereof taken along the line 2-2 of FIG. 1.
Figure 3:
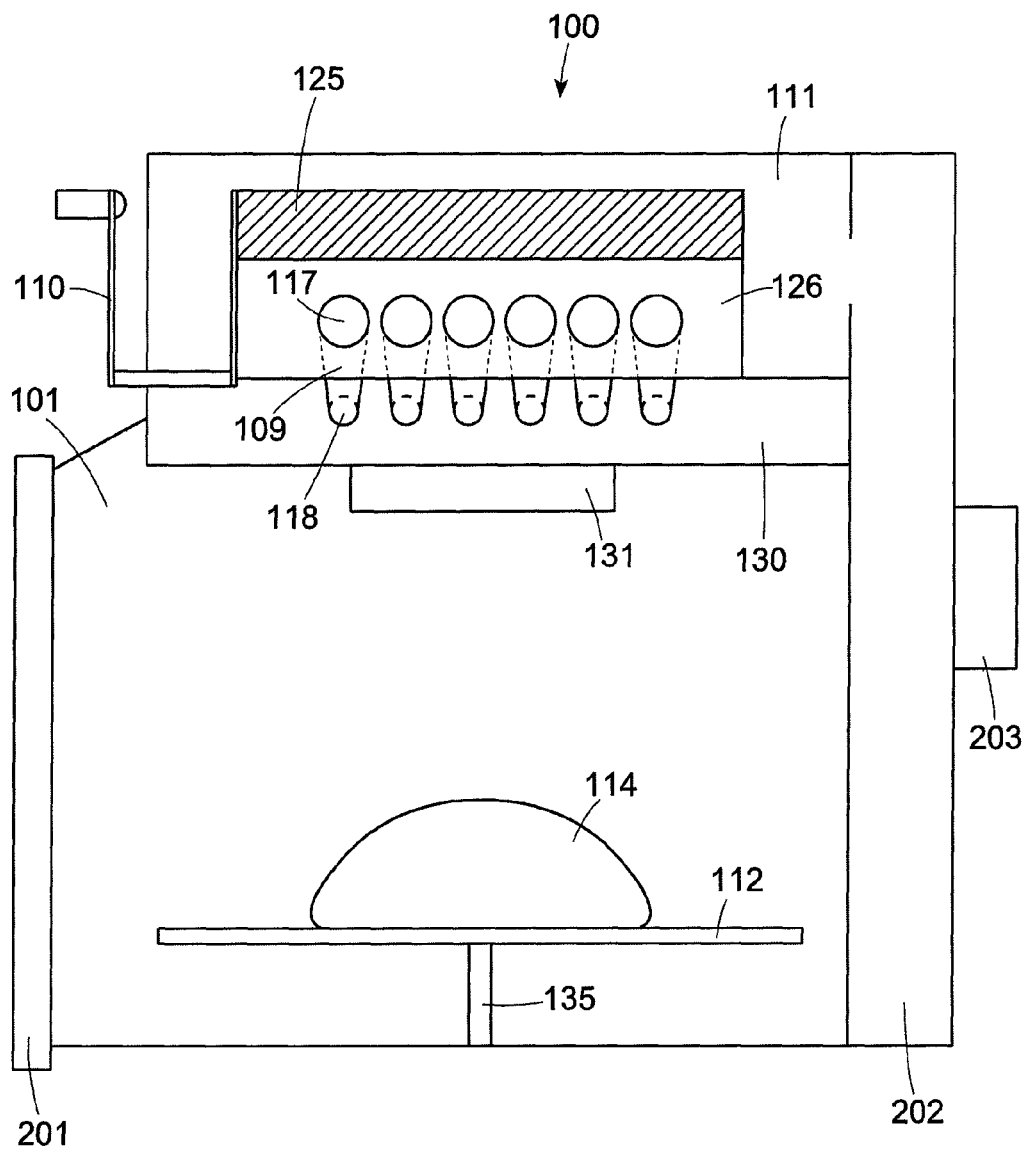
FIG. 3 illustrates yet another sectional view thereof taken along the line 3-3 of FIG. 1.

Referring now to the drawings, in particular to FIGS. 1-3 thereof, therein illustrated is a hybrid oven based on a combination of hot air impingement and microwave according to an exemplary embodiment of the present invention, generally designated by the reference numeral 100. It is first noted that these figures are merely schematic illustrations of an exemplary embodiment of the present invention based on various sectional views and are not intended to reflect the exact dimensions, scales or relative proportions of the oven 100 or components thereof, or the full engineering specification thereof, which should be apparent to those skilled in the art. FIG. 1 is a frontal sectional view of the oven, while FIG. 2 is a side sectional view of the oven taken along the line 2-2 of FIG. 1 and FIG. 3 is another side sectional view of the oven taken along the line 3-3 of FIG.1. The oven 100 comprises a cooking chamber generally designated 101, which is adapted to receive a food product 114 to be placed on a support 112 for cooking. FIGS. 2 and 3 illustrate a door 201 through which the food product 114 can be received by the cooking chamber 101.

The support 112 may comprise a horizontally planar top surface to support the food product 114 and its corresponding bottom surface. The support may further comprise one or more holes or openings therein to facilitate gaseous communication between above the top surface and below the bottom surface of the support 112. The support 112 may be of any feasible shape, common shapes including rectangular and circular shapes. Referring to FIG. 1, when the "right side" and the "left side" of the support 112 are referred to in the following description, they are intended to refer to the two opposite sides of the support 112 as viewed in FIG. 1, wherein the "right" and the "left" are defined by the right and the left side walls of the cooking chamber 101. In alternative embodiments, the support 112 for receiving and holding a food product in the cooking chamber 101 may be in a non-planar form, such as horizontally or vertically positioned skewer. In these cases, the "right" and the "left" sides of the support correspond to the opposite ends of the skewer. It should be appreciated that the "left" and the "right" sides of the support as referred to in the description depend on the physical configuration of the support and the cooking chamber.

The cooking chamber 101, return air plenums 119, 120, an air conduit 202 and an air inlet housing 111 form an air circulation and delivery system of the oven 100. The terms "air" and "airflow" are used interchangeably with "gas" and "gas flow" in this description unless otherwise noted. As shown in FIG. 1, the return air plenums 119, 120 may be positioned adjacent to the bottom portion of the cooking chamber 101 and are adapted for gaseous communication with the cooking chamber 101 through return air exit holes 115, 116. FIG. 1 shows that these return air exit holes 115, 116 are positioned below and in the proximity of the left and the right sides of the support 112, respectively. They are adapted to receive the air flow from within the cooking chamber 101 to be guided to the air conduit 202. While not shown in the figure, the return air exit holes 115, 116 may comprise gates which can be opened or closed based on an external control.

The return air plenums 119, 120 are connected to an air conduit 202 (shown in FIG. 2), which may be vertically disposed on the back side of the oven 100 opposite from the oven door 201. The air conduit 202 allows gaseous communication between the return air plenums 119, 120 and the air inlet housing 111 positioned on the top of the cooking chamber 101. While not shown in the figures, a thermal energy source, such as parallel heating coils, may be coupled to or disposed in the air conduit 202 to heat the air disposed therein. In an alternative embodiment, instead of a single joint air conduit 202, each of the return air plenums 119, 120 may have its own air conduit for gaseous communication with the air inlet housing 111. FIGS. 2 and 3 show a hot air blower 203 which circulates the air in the air circulation and delivery system defined by the cooking chamber 101, the return air plenums 119, 120, the return air conduit 202 and the air inlet housing 111, and provides the desired hot airflow onto the food product 114 placed on the support 112 in the cooking chamber 101.

The air inlet housing 111 positioned on the top of the cooking chamber 101 provides the hot air flow in the form of air impingement into the cooking chamber 101 through at least two nozzles (or impingement tubes) 108 and 109. The two sets of nozzles 108 and 109 are respectively positioned on the opposite sides of a semi-cylindrical base 126 (shown as a semi-circle in the sectional view in FIG. 1) on the top of the cooking chamber 101 in the air inlet housing 111. FIG. 3 shows a row of six nozzles 109 on one side of the base 126. While not shown in any figure, there is another row of six nozzles 108 on the other side of the base 126, with each of the nozzles 108 positioned on one side of the base 126 directly opposite to the corresponding one of the nozzles 109 on the other side of the base 126. Each nozzle 108, 109 has a tubular structure of a given height, and is subtended at one end by a circular inlet orifice 117 positioned within the air inlet housing 111 and at the opposite end by a circular exit orifice 118 protruding in the cooking chamber 101. The nozzle exit orifices direct columnated flows of hot air (air impingement) into the cooking chamber 101. The nozzles are preferably made of a suitably strong and sturdy material (e.g., steel) that can withstand the temperature and pressure of the hot air flowing or being blown through the nozzles.

In an alternative embodiment of the present invention, in addition to the nozzles 108 and 109 protruding from the top of the cooking chamber 101 as shown in FIG. 1, there may be another set of nozzles placed below the support 112 for providing a hot air flow or air impingement to the bottom of the support 112.

In another alternative embodiment of the present invention (e.g., wherein the support for the food product in the cooking chamber is a horizontally positioned skewer), in addition to or as an alternative to the nozzles 108 and 109 protruding from the top of the cooking chamber 101, two corresponding sets of nozzles may be positioned to protrude from the bottom of the cooking chamber 101 to project the air impingements upwards towards the food product supported by the horizontal skewer. In yet another alternative embodiment of the present invention (e.g., wherein the support for the food product in the cooking chamber is a vertically positioned skewer), instead of the nozzles 108 and 109 protruding from the top of the cooking chamber, two sets of nozzles may be positioned to protrude respectively from, for example, the upper portion and the lower portion of a side wall of the cooking chamber. It should be appreciated that, depending on the physical configuration of the cooking chamber and the support for a food product therein, two sets of nozzles for the air impingement may be positioned in various possible places in the cooking chamber to accomplish the substantially similar "sweeping" effects that are to be described below.

Referring back to FIG. 1, two sets of nozzles (i.e., the left nozzles 108 and the right nozzles 109) on the opposite sides of the base 126 are adapted to direct the air impingements in respective directions 123 and 124 as indicated by the dotted lines coming out of the corresponding exit orifices. These directions 123 and 124 are at an angle with respect to the vertical axis of the cooking chamber 101 (or the horizontal plane of the support 112) and cross at a point 127 above the support 112, preferably vertically above the midpoint between the left and the right sides of the support 112 and preferably above the upper surface of any food product 114 placed on the support 112. In this configuration, the respective air impingements coming out of the left and the right nozzles 108 and 109 at the same time at the given angle would collide at the crossing point 127 at a distance from the support 112. If the energies of the air impingements from both nozzles 108 and 109 are equal (i.e., if the flow rates of both nozzles 108 and 109 are same), the net result of such collision would be a net air impingement directed substantially vertically downward from the crossing point 127 toward the point on the support directly below the crossing point 127, preferably the midpoint between the left and the right sides of the support 112. In an alternative embodiment wherein two sets of nozzles are positioned to protrude from the bottom of the cooking chamber and configured to project the air impingements upwards, the crossing point of the respective air impingements may be located below the support for the food product in the cooking chamber. In yet another alternative embodiment wherein the support is vertically positioned (e.g., a vertical skewer) and two sets of nozzles are positioned to protrude from a side wall of the cooking chamber, the crossing point of the respective air impingements may be located at a horizontal distance from the vertical midpoint of the support.

As indicated by the direction 123, the nozzle 108 on the left side of the base 126 directs the air impingement toward the right half of the cooking chamber 101, preferably toward a general area in the proximity of the right side of the support 112. In mirror symmetry, the nozzle 109 on the right side of the base 126 directs the air impingement toward the left half of the cooking chamber 101, as indicated by the direction 124, preferably toward a general area in the proximity of the left side of the support 112. Accordingly, the left and the right nozzles 108 and 109 are configured to generally direct the respective air impingements to the opposite portions of the food product 114 placed on the support 112. It should be appreciated that the "left side" and the "right side" of the support 112 to which the respective air impingements from the nozzles 109 and 108 are generally directed may correspond to any opposite portions of a food product placed on or held by the support. There may be various possible choices for the "left side" and the "right side" of the support depending on the physical configuration of the support and the cooking chamber.

The angle formed by the directions 123 and 124 with respect to the vertical axis of the cooking chamber 101 is determined by where the respective air impingements from the nozzles 108 and 109 are targeting. As an example, FIG. 1 shows that the directions 123 and 124 form an angle of roughly 45 degrees with respect to the vertical axis of the cooking chamber 101 and meet at the crossing point 127 at an angle of roughly 90 degrees. However, these angles may vary depending on the dimensions of the cooking chamber 101 and the support 112, as well as the relative positions of the nozzles 108 and 109.

Figure 4A:
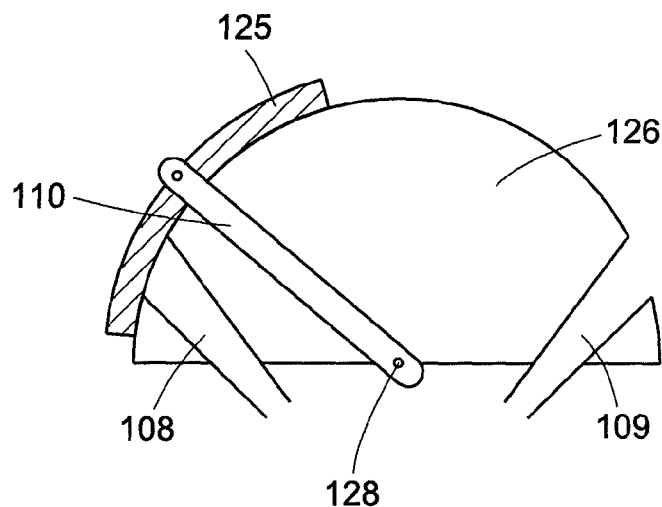
FIGS. 4A, 4B and 4C respectively illustrate various positions of an air modulating cover for controlling the flow rate of the nozzles for air impingement.
Figure 4B:
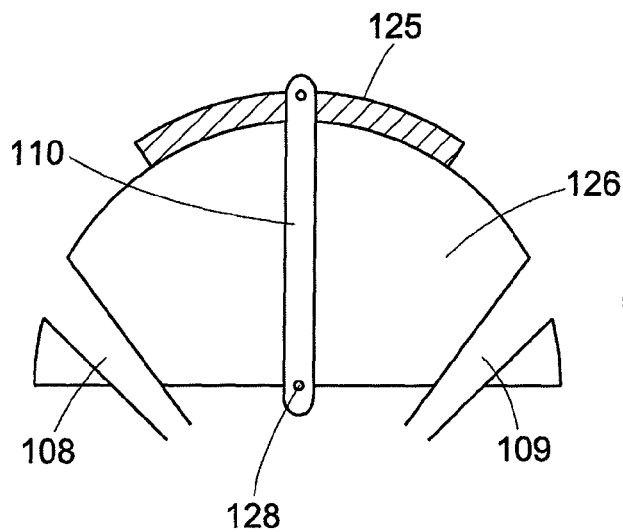
Figure 4C:
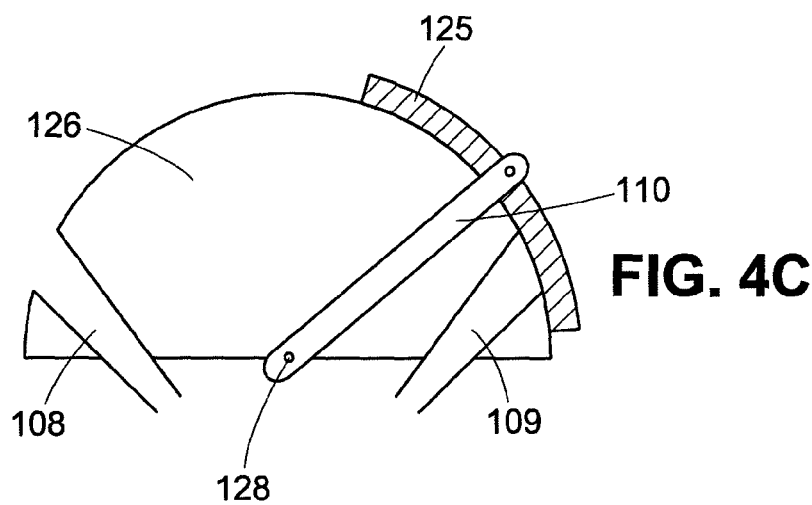

A flow rate of a nozzle may be determined by the dimension of the nozzle and the pressure of hot air into the nozzle. By controlling the input area of the nozzle for the hot air to flow through and thereby effectively changing the dimension of the nozzle, one may modulate the flow rate of the nozzle and consequently its corresponding air impingement applied to the food product 114 in the cooking chamber 101. This air modulation can be achieved by various means, including both manual and automatic control means. As an example, FIG. 1 shows that the oven 100 has an air modulator in the form of a cover 125 impermeable to the air that is configured for and capable of rotationally sliding over the outer surface of the semi-cylindrical base 126 containing two rows of the nozzle inlet orifices 117. This air modulating cover 125 is dimensioned to completely cover, at one time, a portion of the surface of the semi-cylindrical base 126 containing one row of the nozzle inlet orifices 117 so that no hot air may flow into the corresponding nozzles, while allowing the hot air in the air inlet housing 111 to flow into the nozzles positioned on the opposite side of the base 126. This situation is illustrated in FIGS. 4A and 4C. In FIG. 4A, the air modulating cover 125 is positioned to cover the row of the nozzle inlet orifices on the left side of the base 126 so that the air impingement is generated only through the nozzles 109 on the right side of the base 126. In FIG. 4C, the air modulating cover 125 is now positioned to cover the row of the nozzle inlet orifices on the right side of the base 126 so that the air impingement is generated only through the nozzles 108 on the left side of the base 126. When positioned properly, the air modulating cover 125 may be dimensioned to allow the equal amount of hot air in the air inlet housing 111 to flow into each nozzle in the both rows of nozzles 108 and 109 on the opposite sides of the base 126. This is illustrated in FIG. 4B.

As shown in FIG. 1, the position of the air modulating cover 125 on the outer surface of the base 126 may be controlled manually by a handle 110, which is coupled to the air modulating cover 125 through a hinge point 128. In this configuration, a manual torque may be exerted on the handle 110 to rotate the position of the air modulating cover 125 around the hinge point 128.

In an alternative embodiment, the position of the air modulating cover 125 may be controlled automatically by, for example, a suitable electromechanical control device known to those skilled in the art. Such automatic control means may facilitate a periodic change in the position of the cover 125 to create periodic modulations (e.g., sinusoidal modulations, periodic step function modulations, etc.) in time of the respective flow rates for the nozzles 108 on the left side of the base 126 and the nozzles 109 on the right side of the base 126. This periodic change in the position of the air modulating cover 125 to cover the nozzles 108 on the left side of the base 126 and the nozzles 109 on the right side of the base 126 alternatively in time may provide respective periodic modulations in the flow rate of the left and the right set of nozzles 108 and 109 that have the same amplitude and period, but differ in phase by 180 degrees. When the total amount of the hot air disposed in the air inlet housing 111 is maintained to be constant, the sum of the periodically modulated flow rates for the both sets of nozzles 108 and 109 also remains constant in time.

Figure 5A:
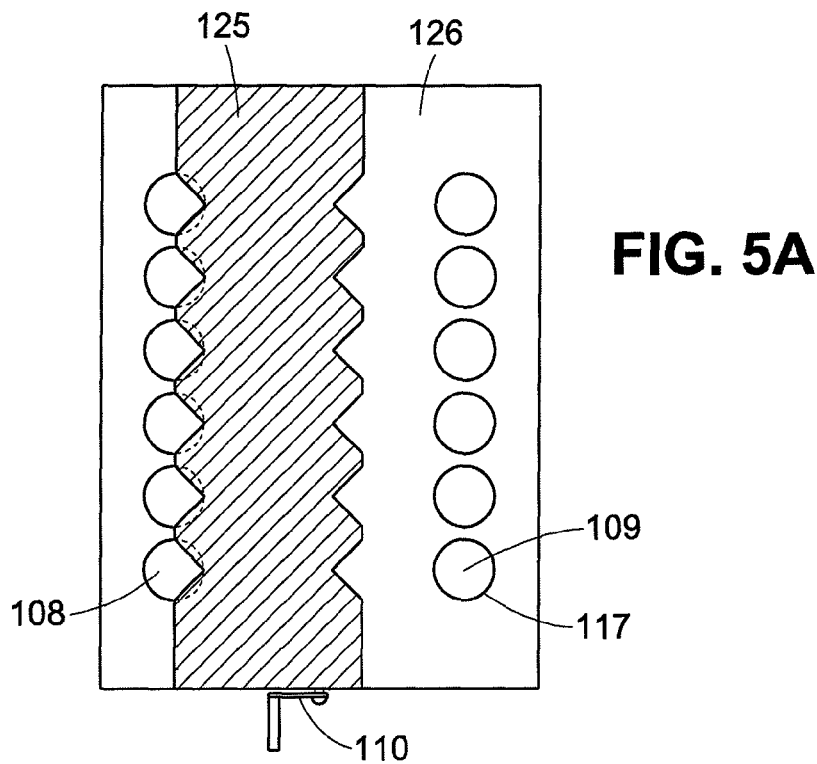
Figure 5B:
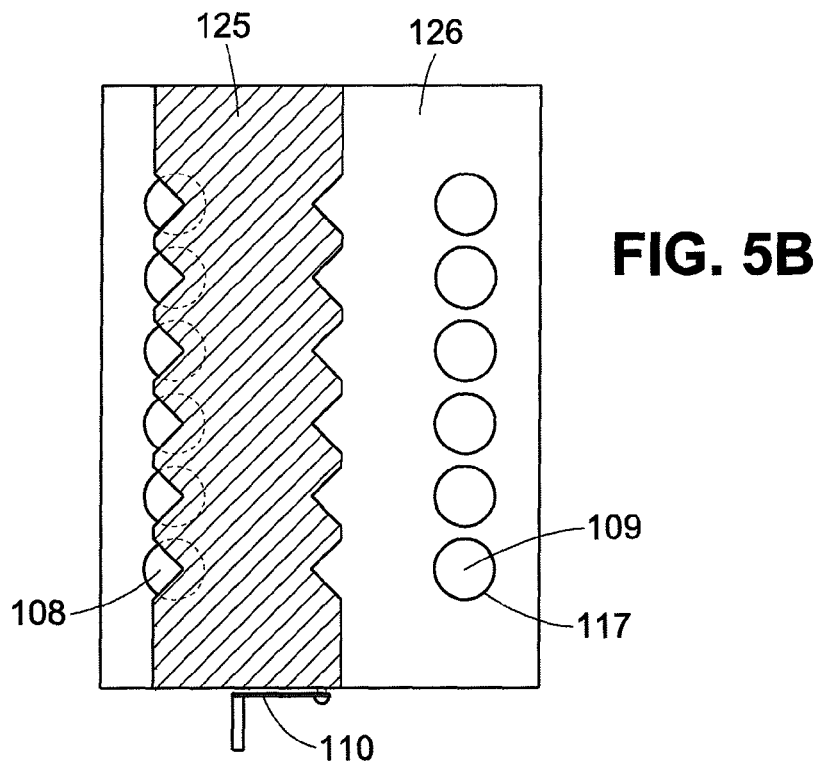

In another alternative embodiment, the side edges of the air modulating cover 125, which respectively slide over the inlet orifices of the left and the right nozzles 108 and 109 during the modulation of the respective flow rates, may be specially shaped or indented to facilitate a more gradual modulation in the flow rates in time and a gradual transition between the opening and the closing of the nozzles. FIGS. 5A-5C illustrate various positions of one exemplary air modulating cover 125, viewed from the top, comprising side edges having triangular indents at the positions corresponding to the nozzle inlet orifices on the surface of the base 126. FIG. 5A shows the left side edge of the air modulating cover 125 just starting to partially cover the inlet orifices of the left nozzles 108. If the side edges were straight as illustrated in FIG. 3, the air modulating cover 125 would have covered the half of the input area of the inlet orifices of the left nozzles 108, but because of the triangular indents on the side edge, the air modulating cover 125 only a small portion of the inlet orifices. FIG. 5B shows the left side edge of the air modulating cover 125 partially covering the inlet orifices of the left nozzles 108. Again, if the side edge were straight, the air modulating cover 125 would have completely covered the inlet orifices, but because of the triangular indents, there are small openings between the air modulating cover 125 and the inlet orifices to let the hot air to flow through. FIG. 5C illustrates the position of the air modulating cover 125 in which the inlet orifices of the left nozzles 108 are finally and completely covered by the cover. Instead of triangular indents, one may alternatively use elliptical indents, semicircular indents or any other shape of the side edges of the air modulating cover 125 that may facilitate a gradual transition between the opening and the closing of the inlet orifices of the nozzles 108 and 109 by the air modulating cover 125.

In yet another alternative embodiment of the present invention, instead of the air modulating cover 125, an air modulator may comprise other feasible means of controlling the flow rate of the hot air through each nozzle. For example, each nozzle may have a gate-like structure which may be shut or open based on an external switch or a command from an external control unit. Such gate-like structure may be placed either at the nozzle inlet orifice, or at the nozzle exit orifice, or at any other suitable place within the nozzle. In another example, the gate-like structure may be capable of varying or adjusting, possibly periodically, the size of the opening through an external control to permit a desired modulation of the flow rate through the nozzle.

The configuration of the nozzles 108, 109 and the air modulating cover 125 for controlling the flow rate of each nozzle as illustrated in FIG. 1 and described above may be operated to cause a time-dependent spatial variation in the net impact or net energy profile of the air impingement applied to the food product 114 placed on the support 112 in the cooking chamber 101 in the following exemplary way. Referring to both FIGS. 1 and 4A, for a predetermined time period, the air modulating cover 125 is positioned on the left side of the base 126 completely covering the inlet orifices of the left nozzles 108, thereby allowing only the right nozzles 109 to provide the air impingement into the cooking chamber 101. As indicated by the general direction 124 of the air impingement from the right nozzles 109, this configuration causes the net impact or energy of the air impingement from the nozzles to be concentrated in the area in the left half of the cooking chamber 101 where the right nozzles 109 are targeting, preferably in the general area in the proximity of the left side of the support 112.

After this time period, as the air modulating cover 125 rotationally slides to the right, away from the inlet orifices of the left nozzles 108, the amount of hot air introduced into the left nozzles 108 increases from zero and at the same time, the amount of the hot air available to the right nozzles 109 starts to decrease. The resulting increasing momentum of the air impingement from the left nozzles 108 in the general direction 123, which collides with the air impingement from the right nozzles 109 at the crossing point 127, would cause the area where the net impact or energy of the air impingement is concentrated to move to the right on the support 112.

Now referring to FIGS. 1 and 4B, for another predetermined time period, the air modulating cover 125 is positioned between the inlet orifices of the left and the right nozzles 108 and 109 so that it allows the equal amounts of the hot air to flow into both the left and the right nozzles 108 and 109. As described above, the respective air impingements having the same energies coming out of the left and the right nozzles 108 and 109 at the same time collide at the crossing point 127, and as a result, the net air impingement is directed vertically downward from the crossing point 127 to the support 112, preferably to the midpoint between the left and the right sides of the support 112. Accordingly, the area where the net impact or energy of the air impingement is concentrated has moved from the left and is now in the general area in the middle of the support 112 or the upper surface of the food product 114 above this general area.

After this time period, as the air modulating cover 125 rotationally slides further to the right, to cover the inlet orifices of the right nozzles 109, the amount of hot air introduced into the right nozzles 109 steadily decreases to zero. The resulting decrease in the momentum of the air impingement from the right nozzles 109 in the general direction 124 would cause the net impact area of the air impingement to further move toward the right on the support 112.

Referring now to both FIGS. 1 and 4C, for yet another predetermined time period, the air modulating cover 125 is now positioned on the right side of the base 126 completely covering the inlet orifices of the right nozzles 109, thereby allowing only the left nozzles 108 to provide the air impingement into the cooking chamber 101. As indicated by the general direction 123 of the air impingement from the left nozzles 108, this configuration causes the net impact or energy of the air impingements from the nozzles to be concentrated in the area in the right half of the cooking chamber 101 where the left nozzles 108 are targeting, preferably in the general area in the proximity of the right side of the support 112.

In this way, the concentration of the net impact/energy of the air impingement from the nozzles may "sweep" across the food product 114 in the cooking chamber 101 from the left to the right and vice versa over time in a controlled manner, thereby facilitating even horizontal distribution of heat energy transfer from the air impingement to the food product and further improving the cooking efficiency of the oven 100. Furthermore, compared to the conventional high-speed cooking ovens based on air impingement, this capability of providing a time-dependent spatial variation of the net impact/energy profile of the air impingement helps to reduce the heat energy loss to the walls of the cooking chamber 101, and minimize the needs for a variable speed motor for the hot air blower 203, the air velocity modulation through dampening, or the modulation of the air heat through adjusting the power of the thermal energy source in the conduit 202. All of these add up to optimize the overall cooking efficiency of the oven 100.

The capability of providing a time-dependent spatial variation of the net impact/energy profile of the air impingement may also be applied to overcome or alleviate the inefficiency arising from the water steam carrying away thermal energy from the food product starting at the temperature of 212° F. as described in the Background section. For example, referring to FIGS. 1 and 4A-C, the air modulating cover 125 is first positioned as illustrated in FIG. 4A so that the net energy of the air impingement is concentrated in the proximity of the surface of the left side of the food product 114. This configuration is maintained until the left side of the food product 114 reaches a temperature slightly under 212° F. Next, the air modulating cover 125 is positioned as illustrated in FIG. 4B, causing the net energy of the air impingement to be generally concentrated in the middle of the food product 114. When the surface of the middle portion of the food product 114 reaches a temperature slightly under 212° F., then the air modulating cover 125 rotationally slides further to the right as illustrated in FIG. 4C, causing the net energy of the air impingement to be concentrated in the proximity of the surface of the right side of the food product 114. This configuration is maintained until the temperature of the surface of the right side of the food product 114 reaches slightly under 212° F. Meanwhile, the heat energies previously transferred to the surfaces of the left side and the middle portion of the food product 114 are dispersed downward below the surface to heat up the inner mass of the food product 114. The above air modulating steps may be repeated, periodically in time, until the internal temperature of the food product 114 in the cooking chamber 101 reaches a desired level.

By maintaining the temperature of the different portions of the surface of the food product 113 slightly under 212° F. and allowing them to disperse the transferred heat energies to the inner mass of the food product alternately at different times, the loss of thermal energy to the water steam from the surface of the food product may be minimized and therefore the efficiency of heat transfer from the air impingement to the food product may be optimized. As to be described below, this can also be done in conjunction with microwave modulations.

In addition, the configuration of the nozzles 108, 109 and the air modulating cover 125 for controlling the flow rate of each nozzle as illustrated in FIG. 1 and described above may be operated in conjunction with the return air exit holes 115, 116 to modulate the air flow below the bottom of the support 112 as follows. For example, the air modulating cover 125 may operate in synchronization with the opening and closing the gates for the left and the right return air exit holes 115 and 116, respectively. When the air modulating cover 125 is positioned as illustrated in FIG. 4A so that the air impingement comes from only the right nozzles 109 toward the left half of the cooking chamber 101, there is consequently a concentration of air flows around the left side of the support 112 compared to the minimal air flows around the right side of the support. By keeping the gates of the left return air exit holes 115 closed and the gates of the right return air exit holes 116 open, the concentration of air flows from around the left side of the support 112 is forced to flow below the full horizontal width of the support 112 from the left end to the right end and exit through the right return air exit holes 116. On the other hand, when the air modulating cover 125 is positioned as illustrated in FIG. 4C so that the air impingement comes from only the left nozzles 108 toward the right half of the cooking chamber 101, there is consequently a concentration of air flows around the right side of the support 112 compared to the minimal air flows around the left side of the support. By keeping the gates of the right return air exit holes 116 closed and the gates of the left return air exit holes 115 open, the concentration of air flows from around the right side of the support 112 is forced to flow below the full horizontal width of the support 112 from the right end to the left end and exit through the left return air exit holes 115. In this way, the air modulating cover 125 and the controller for opening and closing the gates of the return air exit holes 115, 116 can modulate the direction of return air flow beneath the support 112, thereby maximizing the use of the air returning to the return air plenums 119, 120, facilitating the heat transfer to bottom of the support 112 (and consequently the bottom of the food product 114 placed on the support 112) and thereby further optimizing the cooking efficiency of the oven 100. In an alternative embodiment of the present invention, the oven 100 may further comprise another set of nozzles for providing additional hot air flow or air impingements to the bottom of the support 112 to further improve the cooking efficiency of the oven 100.

The nozzles 108, 109 are designed in view of optimizing the air impingements into the cooking chamber 101 and, more importantly, the overall cooking efficiency of the oven 100. Various factors may be taken into account in the design of the nozzles 108, 109 in this regard. As noted in the Background section, the more distant the cross section of an air plume or a hot air column is from the nozzle exit orifice 118, the greater its diameter/cross-sectional area becomes, resulting in reduction in the efficiency of the air impingement. Such expansion of the air plume may be reduced by increasing the speed of the hot air flowing from the nozzles (or the flow rate of the nozzles), which may be achieved by a suitable configuration of the shape and dimension of the nozzles 108, 109. For example, increasing the height of the nozzles may facilitate an increase in the velocity of the air flowing through the nozzles.

However, the flow rate of the nozzles may be limited by the capacity, size, and/or power requirement of the hot air blower 203. In addition, while the increase in the flow rate of the nozzles may improve the efficiency of the air impingement, it needs to be counterbalanced by the concern for the spotting problem as discussed in the Background section, as well as the concern for the potential damages to the food product 114, in particular its visual appearance, due to the rapidly moving hot air. Furthermore, the desire to increase the height of the nozzles 108, 109 to increase their flow rate needs to be counterbalanced by the need to keep the height, and therefore the size, of the oven 100 to a minimum in order to optimize its overall cooking and operating efficiency. When these factors are taken into consideration, it is found that the optimal efficiency in air impingement and optimal cooking efficiency may be achieved with the nozzles 108, 109 having a height of approximately 3 inches and an air speed at the nozzle exit orifice of roughly 25 miles per hour when the food product 114 is between 4 and 12 inches from the nozzle exit orifices.

It is also found that the effective length of the air plume or air impingement generally increases with the increase in the ratio of the area of the nozzle inlet orifice 117 to the area of the nozzle exit orifice 118. Accordingly, the ratio needs to be taken into account when optimizing the efficiency of the air impingement and the overall cooking efficiency of the oven 100. For a nozzle having the height of 3 inches, it is found that the optimal ratio of the nozzle inlet orifice 117 area to the nozzle exit orifice 118 area is roughly 4:1. While a ratio greater than this optimal ratio still leads to a greater effective length in the air plume, a diminished return appears to result from any additional increase in the ratio.

Referring back to FIGS. 1 and 2 and turning now to the microwave-cooking feature of the present invention, in addition to the air circulation and impingement means, the hybrid oven 100 further comprises a pair of microwave resonators 104 and 105, which are respectively positioned at the opposite upper corners of the cooking chamber 101 to launch microwave energies respectively generated by magnetrons 102 and 103 into the cooking chamber 101. While the oven 100 according to the exemplary embodiment in FIG. 1 uses two magnetrons 102 and 103, the present invention is not necessarily limited by the number of magnetrons to generate microwave energies to be guided and launched by the microwave resonators 104 and 105 into the cooking chamber 101. Furthermore, depending on the physical configuration of the support and the cooking chamber of the oven, the positions of the microwave resonators may be selected from various possible choices. For example, in an alternative embodiment, a pair of microwave resonators may be positioned respectively at the opposite bottom corners of the cooking chamber. In yet another alternative embodiment, a pair of microwave resonators may be positioned respectively at the upper and the lower portions of a side wall of the cooking chamber to apply the microwave energy sideways to a food product held by a vertically positioned support such as a skewer.

Each microwave resonator 104, 105 may comprise a upper resonator 130, 132 coupled to the corresponding magnetron 102, 103 to receive microwaves therefrom and a lower resonator 131, 133 coupled to the cooking chamber 101. The upper resonator 130, 132 functions to match with the corresponding magnetron 102, 103 and to guide the microwave energy therefrom to the lower resonator 131, 133. The lower resonator 131, 133 functions to match the upper resonator 130, 132 to the cooking chamber 101 and to launch the microwave energy from the upper resonator 130, 132 into the cooking chamber 101. The opening of the lower resonator 131, 133 into the cooking chamber 101 may be covered by a lid made of quartz so that the microwave radiation being transmitted through the lid from the lower resonator may become polarized. It is found that the optimal microwave efficiency may be achieved when the vertical height of the lower resonator 131, 133 equals one quarter of the microwave wavelength in free space (approximately 1.2 inches) and at least one horizontal width of the lower resonator 131, 133 equals the wavelength of a standing microwave within the upper resonator 130, 132 (e.g., about 6.2 inches based on a suitable dimension of the upper resonator).

The pair of microwave resonators 104 and 105, in particular their respective lower resonators 131 and 133, are adapted to direct the microwave radiation and energies in respective general directions 121 and 122 as indicated by the dotted lines coming out of the lower resonators 131 and 133. These directions 121 and 122 are at an angle with respect to the vertical axis of the cooking chamber 101 (or the horizontal plane of the support 112) and cross at a point 129 at a distance from the support 112, preferably vertically above the midpoint between the left and the right sides of the support 112. The oven 100 may be configured in such a way that this microwave crossing point 129 may take place above the upper surface of any food product 114 placed on the support 112. In the alternative embodiment wherein the microwave resonators are respectively positioned at the opposite bottom corners of the cooking chamber, the microwave crossing point may be located at a distance below the support. In the yet another alternative embodiment wherein the microwave resonators are positioned on a side wall of the cooking chamber, the microwave crossing point may be located at a horizontal distance from the vertical midpoint of the vertically positioned support.

As indicated by the direction 121, the microwave resonator 104 at the left upper corner of the cooking chamber 101 may be adapted to direct the microwave radiation toward the right half of the cooking chamber 101, preferably toward a general area in the proximity of the right side of the support 112. In mirror symmetry as viewed in FIG. 1, the microwave resonator 105 at the right upper corner of the cooking chamber 101 is adapted to direct the microwave radiation toward the left half of the cooking chamber 101 as indicated by the general direction 122, preferably toward a general area in the proximity of the left side of the support 112. Accordingly, the left and the right microwave resonators 104 and 105 are configured to generally direct the respective microwave energies to the opposite portions of the food product 114 placed on the support 112. It should be appreciated that the "left side" and the "right side" of the support 112 to which the respective microwave energies from the microwave resonators 104 and 105 are generally directed may correspond to any opposite portions of a food product placed on or held by the support. There may be various possible choices for the "left side" and the "right side" of the support depending on the physical configuration of the support and the cooking chamber.

The angle formed by the directions 121 and 122 with respect to the vertical axis of the cooking chamber 101 is determined by where the respective microwave radiation from the microwave resonators 104 and 105 are targeting. As an example, FIG. 1 shows that the microwave directions 121 and 122 form an angle of roughly 45 degrees with respect to the vertical axis of the cooking chamber 101 and meet at the crossing point 129 at an angle of roughly 90 degrees. However, these angles may vary depending on the dimensions of the cooking chamber 101 and the support 112, as well as the relative positions of the microwave resonators 104 and 105.

The oven 100 may further comprise a microwave modulator (not shown in the figures) for controlling the amount of the microwave radiation and their energies coming out of each of the microwave resonators 104 and 105 into the cooking chamber 101. The microwave modulation may be achieved by various means. One example of microwave modulation can be achieved by simply switching on and off the power to each of the magnetrons 102 and 103, either manually or by some suitable automatic control means. In another example, the microwave modulation may be achieved by a voltage regulator capable of varying the voltage applied to each of the magnetron 102 and 103 in a controlled manner. The microwave modulator having an automatic control means may facilitate a periodic change in the power or voltage applied to each of the magnetrons 102 and 103, thereby creating a periodic modulation (e.g., sinusoidal modulation, periodic step function modulation, etc.) in time of the microwave energy radiating out of each of the microwave resonators 104 and 105. By periodically alternating between the left and the right magnetrons 102 and 103, the microwave modulator may provide periodic modulations in the microwave energies respectively from the left and the right microwave resonators 104 and 105 that have the same amplitude and period, but differ in phase by 180 degrees. In addition, by maintaining the total microwave energies generated by both the left and the right magnetrons 102 and 103 to be constant (e.g., by turning off one magnetron while the other magnetron is on, or by providing periodic modulations in the voltages provided to the magnetrons 102 and 103 that have the same amplitude and period, but differ in phase by 180 degrees), the sum of the periodically modulated microwave energies from both the left and the right microwave resonators 104 and 105 likewise remains constant.

The configuration of the microwave resonators 104 and 105, illustrated in FIGS. 1 and 2, in conjunction with the above-described microwave modulator may be operated to cause a time-dependent spatial variation in the net microwave energy applied to the food product 114 placed on the support 112 in the cooking chamber 101 in the following exemplary way. Referring back to FIG. 1, for a predetermined time period, the microwave modulator turns on only the left magnetron 102 while keeping the right magnetron 103 turned off, thereby allowing microwave energy to radiate only from the left microwave resonator 104. As indicated by the general direction 121 of the microwave radiation from the left microwave resonator 104, this configuration causes the net microwave energy to be concentrated in the area in the right half of the cooking chamber 101, preferably in the general area in the proximity of the right side of the support 112.

After this time period, the microwave modulator keeps both the left and the right magnetrons 102 and 103 on for another predetermined time period, thereby allowing both the left and the right microwave resonators 104 and 105 to radiate microwave energies into the cooking chamber. It is found that in general, the microwaves radiating from both the left and the right microwave resonators 102 and 103 do not interfere with each other so as to cancel the net microwave energy. Accordingly, it is observed that in this configuration, the net microwave energy is largely concentrated in the middle portion of the support 112, preferably in the general area around the midpoint between the left and the right sides of the support 112 and preferably in the center of the food product 114 placed on the support 112 in the cooking chamber 101.

Next, for yet another predetermined time period, the microwave modulator keeps the right magnetron 103 on while maintaining the left magnetron 102 turned off of the power, thereby allowing only the right microwave resonator 105 to radiate the microwave energy into the cooking chamber 101. As indicated by the general direction 122 of the microwave radiation from the right microwave resonator 105, this configuration causes the net microwave energy to be concentrated in the area in the left half of the cooking chamber 101, preferably in the general area in the proximity of the left side of the support 112.

In this way, the concentration of the net microwave energy radiated from the left and the right microwave resonators 104 and 105 may "sweep" across the food product 114 in the cooking chamber 101 from the right to the left and vice versa over time in a controlled manner, thereby facilitating even horizontal distribution of heat energy transfer from the microwave radiation to the food product and further improving the microwave efficiency and the overall cooking efficiency of the oven 100. Furthermore, compared to the conventional high-speed cooking ovens based on microwave, this selective directionality of the net microwave energy helps to reduce the microwave radiation loss to the walls or other spaces of the cooking chamber 101, thereby optimizing the microwave efficiency and the overall cooking efficiency of the oven 100.

The capability of providing a time-dependent spatial variation in the net microwave energy may also be applied to overcome or alleviate the inefficiency arising from the water steam carrying away thermal energy from the food product starting at the temperature of 212° F. as described in the Background section. For example, referring to FIG. 1, the microwave modulator first keeps the left magnetron 102 on while maintaining the right magnetron 103 turned off so that the net microwave energy is concentrated in the proximity of the right side of the food product 114. This configuration is maintained until the right side of the food product 114 reaches a temperature slightly under 212° F. Next, the microwave modulator keeps both the left and the right magnetrons 102 and 103 on, causing the net microwave energy to be generally concentrated in the middle of the food product 114. When the middle portion of the food product 114 reaches a temperature slightly under 212° F., then the microwave modulator turns off the left magnetron 102, while keeping the right magnetron 103 on, causing the net microwave energy to be concentrated in the proximity of the left side of the food product 114. This configuration is maintained until the temperature of the left side of the food product 114 reaches slightly under 212° F.

Meanwhile, the heat energies previously transferred to the right side and the middle portion of the food product 114 are dispersed throughout the inner mass of the food product 114. The above microwave modulating steps may be repeated, periodically in time, until the internal temperature of the food product 114 in the cooking chamber 101 reaches a desired level.

By maintaining the temperature of the different portions of the surface of the food product 113 slightly under 212° F. and allowing them to disperse the transferred heat energies to the inner mass of the food product alternately at different times, the loss of thermal energy to the water steam from the surface of the food product may be minimized and therefore the efficiency of heat transfer from the microwave energy to the food product may be optimized.

Under the present invention, the operation settings of the oven 100 may comprise various possible combinations and sequences of open and close configurations of the left and the right nozzles 108 and 109 and on and off configurations of the left and the right magnetrons 102 and 103. In addition, the operations of the air modulator (e.g., in the form of the movable air modulating cover 125 in FIG. 1) for controlling the air impingement and the microwave modulator for controlling the microwave radiation may be coordinated and synchronized with each other to achieve the desired heat transfer effect. In one possible configuration, the air modulator and the microwave modulator may operate in phase in the following exemplary way. Referring to FIG. 1, for a predetermined time period, the air modulating cover 125 is positioned to keep the right nozzle 109 open and the left nozzle 108 closed (as illustrated in FIG. 4A), while the microwave modulator keeps the right magnetron 103 on and the left magnetron 102 off. For the next predetermined time period, the air modulating cover 125 is positioned to keep both the right and the left nozzles 109 and 108 open (as illustrated in FIG. 4B), while the microwave modulator keeps both the right and the left magnetrons 103 and 102 on. For the third predetermined time period, the air modulating cover 125 is positioned to keep the left nozzle 108 open and the right nozzle 109 closed (as illustrated in FIG. 4C), while the microwave modulator keeps the left magnetron 102 on and the right magnetron 103 off. As a result, the effects of the net air impingement and microwave energies "sweeping" across the food product 114 from one side to the other in time are in phase and therefore amplified.

On the other hand, since the heating by the air impingement and the microwave heating cause different kinds of impacts on the food product 114, one might instead desire to have the air modulator and the microwave modulator to operate out of phase so as to avoid the simultaneous heating of the same portion or side of the food product 114 in the cooking chamber 101 by both the air impingement and the microwave energy. To illustrate one exemplary out-of-phase operation by the air modulator and the microwave modulator, an alternative embodiment capable of opening and closing both the left and the right nozzles 108 and 109 at the same time is used. For the first predetermined time period, the air modulator keeps the right nozzle 109 open and the left nozzle 108 closed, while the microwave modulator keeps the left magnetron 102 on and the right magnetron 103 off. For the next predetermined time period, the air modulator keeps both the right and the left nozzles 109 and 108 closed, while the microwave modulator keeps both the right and the left magnetrons 103 and 102 on. For the third predetermined time period, the air modulator keeps the left nozzle 108 open and the right nozzle 109 closed, while the microwave modulator keeps the right magnetron 103 on and the left magnetron 102 off. For the fourth predetermined time period, the air modulator keeps the right nozzle 109 open and the left nozzle 108 closed, while the microwave modulator keeps the left magnetron 102 on and the right magnetron 103 off, as in the first predetermined time period. For the fifth predetermined time period, the air modulator keeps both the right and the left nozzles 109 and 108 open, while the microwave modulator keeps both the right and the left magnetrons 103 and 102 off. For the sixth and the final predetermined time period of one cycle, the air modulator keeps the left nozzle 108 open and the right nozzle 109 closed, while the microwave modulator keeps the right magnetron 103 on and the left magnetron 102 off, as in the third predetermined time period. As the result of this out-of-phase operations by the air modulator and the microwave modulator, there is no simultaneous heating of the same portion or side of the food product 114 by both the air impingement and the microwave energy.

Other features of the hybrid oven 100 are also designed in view of optimizing the microwave efficiency, i.e., to maximize the amount of the microwave energy directed to the food product 114 and minimize the amount of the microwave energy lost to the cavities, plenums, magnetrons, etc. or radiated away from the food product 114. For example, the diameter of the nozzle exit orifice 118 is sized to prevent microwave energies from entering the nozzle and thereby becoming dissipated away rather than being applied to the food product 114. It is found that the diameter of approximately 0.75 inches for the nozzle exit orifice 118 may be able to keep microwave energies from entering the nozzles, thereby optimizing the microwave efficiency in the oven 100.

The support 112 may be adapted to rotate around the vertical axis 135 at its center. Such rotation of the support 112 help to alleviate the problem of horizontal unevenness in the microwave heat energy distribution. In addition, the oven 100 may be adapted to control and modulate the position of the support 112 with respect to the bottom of the cooking chamber 101. As an example, FIG. 1 shows the support 112 elevated to a higher position 113 vertically along the axis 135. This may be achieved either manually or by a suitable electromechanical elevation control means. Such modulation of the height of the support 112 may be used to alleviate the problem of vertical unevenness in the microwave heat energy distribution.

The optimal microwave efficiency may also be achieved by matching the size of the cooking chamber 101 with the microwave load. It is found that the optimal matching can be achieved by sizing preferably all, but at least one, of the vertical height, and horizontal width and depth of the cooking chamber 101 (as viewed in FIG. 1) in integer multiples of the microwave wavelength (approximately 4.82 inches in free space). Such dimensions of the cooking chamber 101 facilitate the accommodation of standing microwaves in the cooking chamber 101, thereby minimizing the reflection of microwaves at the walls of the cooking chamber and the resulting loss of the microwave energy to the cavities, plenums, magnetrons, etc. Hence, to optimize the microwave efficiency, preferably all, but at least one, of the vertical height, and the horizontal width and depth of the cooking chamber 101 of the oven 100 is sized in integer multiples of the microwave wavelength, or selected from one of 4.82 inches, 9.64 inches, 14.46 inches, 19.28 inches, 24.10 inches, etc.

The above-described features and improvements in accordance with the present invention enable a high-speed cooking oven based on a combination of hot air impingement and microwave to deliver optimal cooking efficiency. Tangible benefits of this improvement in the cooking efficiency in the high-speed cooking technology are the reduction in the cooking time at a given electrical power supply, and alternatively, the reduction in the electrical power required to operate a high-speed cooking oven for a given cooking capacity (i.e., given cooking time). As noted in the Background section, because of their sub-optimal cooking efficiency, the conventional high-speed cooking ovens must operate on an electrical power supply based on 220 volts or greater. By further improving and optimizing the cooking efficiency under the present invention, the high-speed cooking technology based on a combination of air impingement and microwave may now be extended with more productive results to ovens operating on an electrical power supply based on a voltage less than 220 volts, preferably a power supply based on a voltage between 110 and 125 volts and a current of 30 amperes or less, which is more widely available than the 220 volt-based power supply. Hence, the present invention enables the high-speed cooking technology to find a wider range of applicability and customer base compared to the conventional high-speed cooking technology with the sub-optimal cooking efficiency.

While this invention has been described in conjunction with exemplary embodiments outlined above and illustrated in the drawings, it is evident that many alternatives, modifications and variations will be apparent to those skilled in the art. Accordingly, the exemplary embodiments of the invention, as set forth above, are intended to be illustrative, not limiting, and the spirit and scope of the present invention is to be construed broadly and limited only by the appended claims, and not by the foregoing specification.

What is claimed is:

1. An oven for cooking a food product, comprising:
   a cooking chamber comprising a top and a support for receiving the food product for cooking;
   a conduit for providing a gas into the cooking chamber;
   a thermal energy source for heating the gas disposed in the conduit;
   a first nozzle for causing a first impingement of the gas from the conduit into the cooking chamber; and
   a second nozzle for causing a second impingement of the gas from the conduit into the cooking chamber,
   wherein the first nozzle is configured and positioned to direct the first impingement of the gas generally toward a first side of the support, the second nozzle is configured and positioned to direct the second impingement of the gas generally toward a second side of the support, the first and the second sides being generally opposite sides of the support, and the first and the second nozzles are further configured and positioned to respectively direct the first and the second impingements of the gas to meet each other above the food product on the support in the cooking chamber.

2. The oven of claim 1, wherein the first side comprises a right edge of the support and the second side comprises a left edge of the support.

3. The oven of claim 1, wherein the first and the second nozzles are further configured and positioned to respectively direct the first and the second impingements of the gas to meet each other above the midpoint between the first and the second sides of the support in the cooking chamber.

4. The oven of claim 1, wherein the first and the second nozzles are dimensioned to optimize the flow rates of the gas.

5. The oven of claim 1, wherein the diameter of each of the first and the second nozzles is dimensioned to optimize the flow rate of the corresponding nozzle.

6. The oven of claim 1, wherein the length of each of the first and the second nozzles is dimensioned to optimize the flow rate of the corresponding nozzle and the dimension of the cooking chamber simultaneously.

7. The oven of claim 6, wherein the length of each of the first and the second nozzles is substantially 3 inches.

8. The oven of claim 1, wherein the ratio of the inlet orifice area to the exit orifice area for each of the first and the second nozzles is set to optimize the air impingement from the corresponding nozzle.

9. The oven of claim 8, wherein the ratio of the inlet orifice area to the exit orifice area for each of the first and the second nozzles is substantially 4 to 1.

10. The oven of claim 1, wherein the respective directions of the first and the second impingements of the gas are at a substantially 90-degree angle with respect to each other.

11. The oven of claim 1, wherein the first and the second nozzles are further configured to respectively direct the first and the second impingements of the gas at a substantially 45-degree angle with respect to the support.

12. The oven of claim 1, wherein the first nozzle is positioned at a first half of the top and the second nozzle is positioned at a second half of the top.

13. The oven of claim 1, further comprising a support controller for modulating in time the distance of the support from the first and the second nozzles.

14. The oven of claim 1, further comprising a third nozzle for causing a third impingement of the gas from the conduit into the cooking chamber, the third nozzle being configured and positioned to direct the third impingement of the gas below the support.

15. The oven of claim 1, wherein the conduit comprises a first return air exit and a second return air exit below the support in the cooking chamber, the first and the second return air exits being positioned on the opposite sides of the cooking chamber respectively proximate to the first and the second sides of the support.

16. The oven of claim 15, further comprising a return air exit controller for controlling the closing and the opening of each of the first and the second return air exits.

17. The oven of claim 16, wherein the return air exit controller is adapted to close the first return air exit and open the second return air exit when the first air impingement is greater than the second air impingement, and to open the first return air exit and close the second return air exit when the second air impingement is greater than the first air impingement.

18. The oven of claim 1, wherein the oven is adapted to be powered by a voltage less than 220 volts.

19. The oven of claim 18, wherein the voltage is between 110 and 125 volts.

20. The oven of claim 1, further comprising an air modulator for controlling respective flow rates of the gas for the first and the second impingements.

21. The oven of claim 20, wherein the air modulator is adapted to cause a time-dependent spatial variation in the sum of the first and the second impingements of the gas applied to the food product in the cooking chamber.

22. The oven of claim 20, wherein the air modulator is configured to provide a first periodic modulation in time of the flow rate of the gas for the first impingement and a second periodic modulation in time of the flow rate of the gas for the second impingement, the first and the second periodic modulations having substantially the same amplitude and period but differing in phase by 180 degrees.

23. The oven of claim 22, wherein the sum of the first and the second periodic modulations is substantially constant in time.

24. The oven of claim 22, wherein the first periodic modulation comprises a first sinusoidal function in time for the flow rate of the first impingement and the second periodic modulation comprises a second sinusoidal function in time for the flow rate of the second impingement, the first and the second sinusoidal functions having substantially the same amplitude and period but differing in phase by 180 degrees.

* * * * *